United States Patent [19]

Peuzin

[11] 3,918,012

[45] Nov. 4, 1975

[54] METHOD AND DEVICE FOR PROVIDING A VARIABLE DELAY LINE

[75] Inventor: Jean Claude Peuzin, Eybens, France

[73] Assignees: Commissariat a l'Energie Atomique, Paris; Agence Nationale de Valorisation de la Recherche Anvar, Neuilly-sur-Seine, both of France

[22] Filed: July 29, 1974

[21] Appl. No.: 492,856

[30] Foreign Application Priority Data

Aug. 3, 1973 France .............................. 73.28443

[52] U.S. Cl. .............................. 333/30 R; 333/30 M

[51] Int. Cl.²... H03H 9/26; H03H 9/30; H03H 9/32

[58] Field of Search............ 333/30 R, 30 M, 71, 72

[56] References Cited

UNITED STATES PATENTS

| | | | |
|---|---|---|---|
| 3,138,789 | 6/1964 | Pugh | 333/30 M X |
| 3,173,131 | 3/1965 | Perucca | 333/30 M X |
| 3,200,354 | 8/1965 | White | 333/30 R |
| 3,254,231 | 5/1966 | Gandhi | 333/72 X |
| 3,309,628 | 3/1967 | Olson | 333/30 R |
| 3,451,046 | 6/1969 | Cohler | 333/30 R X |
| 3,710,465 | 1/1973 | Thomann | 333/30 R X |
| 3,753,163 | 8/1973 | Morgenthaler | 333/30 R |
| 3,793,598 | 2/1974 | Hofelt et al. | 333/30 M |

*Primary Examiner*—James W. Lawrence
*Assistant Examiner*—Marvin Nussbaum
*Attorney, Agent, or Firm*—William R. Woodward

[57] ABSTRACT

This invention relates to a method and device for providing a variable delay line. The delay is adjusted by the movement of a wall separating two adjacent portions having different electromechanical properties which are thereby discontinuous. An acoustic wave is produced in one end portion having a carrier frequency which is modulated by the signal to be delayed, the acoustic wave propagating inside the bar in a direction which is perpendicular to the discontinuity surface. The electric signal produced by the surface is connected to a receiver circuit and the delay is obtained by electromechanical means varying the position of the wall along the direction perpendicular to the discontinuous surface.

13 Claims, 5 Drawing Figures

METHOD AND DEVICE FOR PROVIDING A VARIABLE DELAY LINE

The invention relates to a method and device for providing a variable delay, the delay being adjusted by the adjustable movement of a wall separating two domains in a single ferroelectric or ferromagnetic bar.

As is known, a delay line is a device adapted to convert an "input" signal E(t) into an "output" signal $E'(t)$ so that $E'(t) = E(t-T)$, where T is the delay time. In the prior art, a distinction is made between fixed delay lines, wherein the delay time T is given by the construction, and variable delay lines wherein the delay time T can be modified as required, within certain limits. In the latter case, the delay T may vary either discontinuously (digital-control device) or continously (analog control device). In the following description, we shall be concerned only with the latter kind of device (analog control).

In general, a signal can be delayed by transmitting it in wave form (e.g. an acoustic or electric wave) through a medium having a length L, wherein the propagation velocity of the wave is $v$. Clearly, during this process, a signal entering the device at the instant $t$ is delayed by $T = L/v$ and is output at the time $t + T$. T is varied by acting either on the length L of the wave path or on the wave propagation velocity $v$.

In the prior art, there are mechanical delay lines and electronic delay lines, which are subdivided into dispersive, magnetostatic and acoustooptic delay lines.

In the case of mechanically adjusted delay lines, the length L is magnetically adjusted so as to vary T. A recent embodiment uses surface acoustic waves (Tamm waves) in a solid, based on a principle discovered by Bond (Appl. Phys. Letters 14 No. 4, 1969); earlier mechanical embodiments used magnetostrictive metal wires along which a receiver coil can be moved, the transmitter coil being stationary; these embodiments have also been disclosed in technical and scientific publications (E. M. Braburd Elec. Commun., 28 46, (1951) and D. A. Aaronson D.B. James IRE Trans. on Electronic Computers, EC9 329 (1960)). These systems have the disadvantages of any mechanical device, i.e. they are bulky, fragile and, above all, take a long and difficulty-adjustable time to respond to the delay control means.

In electronically adjusted delay lines, the delay T is controlled by an electric variable such as the current, voltage or frequency. There are no moving components, which is an advantage over mechanically adjusted delay lines. Three kinds of embodiments have been described so far: dispersive delay lines using a dispersive medium (J. F. May Jr Physical Acoustics, I Part A, page 417, ed. WP Mason, 1964), i.e. a medium where the propagation velocity $v$ depends on the frequency. The signal to be delayed modulates a carrier wave having a frequency $f$ at which the medium is transparent. The delay T is varied by varying the frequency $f$, i.e. the velocity v, the length L remaining constant. The delay is controlled by purely electronic means, which are much quicker than mechanical control means. The disadvantage of the system is the small range of possible variations in T. As is known, the dispersivity of a medium, i.e. the variation in the propagation velocity with frequency, depends on the absorption of the medium; if the medium is non-absorbent, i.e. if it does not unduly attenuate a wave travelling through it, it is not very dispersive at the corresponding frequency. Conversely, if we require a large delay range, we need a highly dispersive and therefore very absorbent medium.

In the case of magnetostatic delay lines operating at a constant length L, the propagation velocity $v$ of a magnetostatic mode is varied by means of a magnetic field (L.R. Walker, Physics Review 105 390 (1957)), and the medium in which the wave propagates is usually a ferri-magnetic material such as ironyttrium garnet. A number of articles have been written on this kind of delay line. A recent International Congress (International Seminar on ferrite microwave devices, Toulouse, 1972) has reported on the state of the art. The main disadvantage of magnetostatic lines is the wide scatter in the delay time. In order to prevent the signal modulating the carrier frequency from being excessively distorted, all the frequencies making up its spectrum must correspond to waves for which the delay T imposed by the line is constant, i.e. does not depend on the frequency. Since the line is very dispersive, the pass band used around the carrier wave must be kept very narrow, thus seriously reducing the usefulness of these devices.

Acousto-optic delay lines, as described in the general article by Dieulesaint (Onde electrique, 50, 899, 1970), are based on the use of an acoustic wave in a transparent medium, the signal being optically extracted by photoelastic interaction. The device can be either mechanically or electronically controlled; in the latter case an analog light deflector is used. The main disadvantage of lines of this kind, of course, is their complexity and their corresponding bulk and cost.

The invention relates to a method of obtaining a variable delay on a variable delay line which is easily manufactured, the delay being rapidly controlled by electric means and having a wide range.

The method according to the invention is characterised in that:

two adjacent portions are produced in a material, the portions having different electromechanical properties and separated by a wall, the position of which is adjustable, where the electromechanical properties are discontinuous (the material may e.g. be in the shape of a cylindrical bar), at one end of the material an acoustic wave is produced having a carrier frequency which is modulated by the signal to be delayed, the acoustic wave propagating inside the material in a direction perpendicular to the discontinuity surface, the electric signal produced by the discontinuity wall or surface is received in a receiver circuit; and the variable delay is adjusted by electromechanical means by varying the position of the discontinuity wall along a direction parallel to the generatrices of the cylinder forming the bar; and after reception, the delayed signal is separated from the carrier wave by a known demodulator.

In the description, the material forming the delay line has the shape of a cylindrical bar. Of course, the invention includes material having different geometrical shapes; the bar can be closed on itself to form a torus, rolled in a spiral or helix, or may undulate to form as S or a zig-zag. The latter shapes have the advantage of reducing the bulk of the delay line.

According to a first variant of the invention, a piezoelectric delay line is characterised in that an acoustic carrier wave modulated by the signal to be delayed is emitted at an end A of a cylindrical bar made of a ferroelectric material, a wall P where the piezoelectric constant is discontinuous, is disposed in the path of the wave propagating in a direction Ox parallel to the cylinder generatrices, wall P corresponding to the junction between two ferroelectric domains polarised in opposite directions, the distance L measured along Ox between wall P and the end A of the ferro-electric plate is adjusted so that the time taken by the acoustic wave to travel from A to P is equal to the delay which it is desired to introduce via the delay line, and the delayed signal produced by the wall P as a result of the acoustic wave is collected in a receiver.

A second variant of the invention relates to a method of providing a variable delay, using the "magnetostrictive" effect, characterised in that an acoustic carrier wave modulated by the signal to be delayed is emitted at an end A′ of a cylindrical bar F′ made of a ferromagnetic material, a wall P′ where the magnetostrictive constant is discontinuous is disposed in the path of a wave propagated in a direction $O'x'$ parallel to the cylinder generatices, the wall P′ corresponding to the junction between two ferromagnetic domains magnetised in opposite directions, the distance L′ measured along $O'x'$ between wall P′ and the end A′ of the ferromagnetic bar is adjusted so that the time T′ taken by the acoustic wave to travel from A′ to P′ is equal to the delay which it is desired to introduce via the delay line, and the delayed signal produced by the wall P′ due to the wave is collected in a receiver.

Ferro-electricity is the property of crystalline substances of having a spontaneous, permanent electric polarisation which can be reversed by the action of an external electric field. In some respects, the dielectric properties of such substances are similar to those of ferromagnetic substances; hence the name "ferroelectric material." The orientation of polarisation may be the same through the entire crystal, which then has one domain, or may be in one direction in one region of the crystal, and in a different direction in another domain. Between two such domains, we then have a wall where the piezoelectric constant is discontinuous. This wall will hereinafter be called P.

All ferroelectric materials, such as barium titanate, have piezoelectric porperties. Piezoelectricity is equivalent to the deformation of a crystal under the action of an applied electric field.

In a device for working the method according to the invention, the polar axis Oz of the ferroelectric material extends perpendicular to the cylindrical bar and the position of wall P at which the piezoelectric constant is discontinuous coincides with the position of a flat equipotential surface formed by a plane perpendicular to Ox, a d.c. electric field being produced along the Oz axis by a pair of electrodes $S_1$ and $S_2$, one on each side of the ferroelectric material, the electrodes producing the d.c. electric field which changes sign on the two sides of wall P.

A d.c. voltage $V_c$ is applied to electrode $S_1$ which is made of conductive material, and voltages $+V_P$ and $-V_p$ are applied to the ends $P_1$ and $P_2$ of an electrode $S_4$ made of a resistive material such that we have $-V_p < V_c < V_p$, thus forming the wall P which connects the straight lines E and F, line E being an equipotential line on electrode $S_4$ at which the voltage is equal to $V_c$, and line F being a corresponding straight line on electrode $S_2$.

In the device for working the invention, the acoustic longitudinal wave is produced at end A of bar F by two electrodes $E_1$ nd $E_2$ having a length along Ox equal to half the wavelength of the carrier acoustic wave in the ferroelectric material, electrodes $E_1$ and $E_2$ being disposed one on each side of the bar and both being energised by a variable potential difference at the frequency of the carrier wave, modulated by the signal to be delayed. The delayed signal is collected in the form of a potential difference at two electrodes $S_1$ and $S_4$ disposed one on each side of the bar, the potential difference being induced at electrodes $S_1$ and $S_4$ by wall P under the pressure of the longitudinal acoustic wave when it arrives at P, the distance between wall P and the centre of electrodes $E_1$ and $E_2$ being equal to L. The The last-mentioned phenomenon can be explained as follows:

In a piezoelectric material, any surface where the piezoelectric constant is discontinuous, when placed in a uniform electric field E, is subjected to a surface force:

$$F = \Delta e.E$$

where $\Delta e$ is the value of the discontinuity of $e$. The separating surface between the air and a piezoelectric solid having a coefficient $e$ is a surface where the discontinuity of the coefficient is exactly equal to e in the direction perpendicular to the plate; if the surface is subjected to a spatially homogeneous sinusoidal electric field $Ee^{j\ t}$, the surface force on the surface also has the form $Fe^{j\ t}$. The surface then appears as a source of acoustic waves having a pulsation $\omega$. This phenomenon is used in the microwave region for generating ultrasound in quartz bars. The same phenomenon occurs in a wall separating two domains having opposite polarity in a ferroelectric material. In the latter case, the wall is also a discontinuity for the piezoelectric constant. The discontinuity is equal to 2 $e$, where $e$ is the piezoelectric constant measured in a domain. Consequently, the pressue induced by an electric field on the wall is equal to 2eE. In the device according to the invention, the discontinuity in the electric field in the direction Oz on each side of wall P coincides with an equipotential line of the field produced by the two electrodes $S_1$ and $S_2$. This coupling between the electric field and the acoustic wave at a discontinuity in e is reversible, i.e. an ultrasonic wave travelling through a wall of a ferroelectric domain produces charges in suitably-disposed electrodes. Accordingly, a free surface or wall between two domains associated with a suitable electrode configuration forms a reversible electromechanical transducer; the importance of the ferroelectric wall according to the invention is that, in contrast to a free surface, it can be moved in the material by electromechanical energisation; to this end, according to the invention, a d.c. electric field is used which is parallel to the polar axis and cancels out at an adjustable point.

Accordingly, the transducer essentially comprises a wall P associated with a receiver whose position in the propagation medium may vary in dependence on an external control means, i.e. the potentials applied to electrodes $S_1$ and $S_2$. In the device, the control is determined by the distance between the ferroelectric wall and the stationary transducer formed by electrodes $E_1$ and $E_2$ enclosing the ferroelectric plate. Under the action of the sinusoidal electric field applied to the terminals of electrodes $E_1$ and $E_2$, the piezoelectric crystal is energised by an electric field in a direction Oz, thus inducing an acoustic wave in the perpendicular direction Ox, due to the fact that the tensor relating the deformations to the electric field has non-diagonal components. The longitudinal acoustic wave propagates in the bar as far as the wall P bounding the two ferroelectric domains, which vibrates under the action of the acoustic wave generated by electrodes $E_1$ and $E_2$. The vibration is shown by an electric field having a component along the Oz axis and producing a variable potential difference between electrodes $S_1$ and $S_4$. The delay is dependent on the distance between the transducer and the movable ferroelectric wall P.

In one embodiment of the invention, the electrodes $S_2$ and $S_4$ disposed on the same side of the cylindrical bar are separated by a dielectric plate, the capacitance formed by $S_4$ and $S_1$ being considerably greater than the capacitance formed by $S_1$ and $S_2$.

In a variant embodiment, electrode $S_4$ is in the form of a thin trapezoidal plate, both bases of which are parallel to the Ox axis. Electrode $S_4$ is trapezoidal so as to avoid discontinuities which would occur if electrode $S_4$ had sharp ends and which would produce an interfering response when the acoustic signal travelled past the electrodes.

A preferred embodiment of the invention is characterised in that it comprises an a.c. generator modulated so as to energise electrode $E_1$, electrode $E_2$ being connected to earth and electrode $S_4$ being connected to a receiver, the d.c. supply to plates $S_1$ and $S_2$ being via inductance coils in series with decoupling capacitors connected to earth at a fixed point between the electrodes and the inductance coils.

A variant of the method according to the invention uses a Bloch wall between two ferromagnetic domains.

A substance is called ferromagnetic if it has a spontaneous magnetic moment, i.e. a magnetic moment even in the absence of an applied magnetic field; magnetisation to saturation, denoted by $M_s$ is defined as the spontaneous magnetic moment per unit volume. Under the action of an external magnetic field, the magnetic moment of the ferromagnetic material is aligned along the external magnetic field. According to the invention, two magnetic fields in opposite directions are applied along the easy magnetisation axis of a ferromagnetic material so that, in a first domain in the bar, the magnetic moment $M_s$ is parallel to the Oz axis, whereas in a second domain the magnetic moment $M_s$ is antiparallel to Oz. Between two such domains, there is a discontinuity wall called the Bloch wall and hereinafter denoted P'. Ferromagnetic materials such as iron or nickel are also magnetostrictive under the action of a magnetic field; the physical dimensions of the ferromagnetic substance are modified, so that an acoustic wave is generated. The method and device for manufacturing a delay line wherein ferromagnetic walls are moved is derived from the method and device wherein a ferroelectric wall is moved, simply by using corresponding magnetostatic features instead of electrostatic features.

According to the invention, a device for working the method of providing magnetostrictive delay line is characterised in that it comprises a ferromagnetic cylindrical bar F' whose easy magnetisation axis is along the $0'z'$ axis perpendicular to $0'x'$ and adjacent coils $B_1$ and $B_2$ through which adjustable currents $i_1$ and $i_2$ flow respectively, the coils producing magnetic fields in the direction $0'z'$ and in the opposite direction. The fields induce opposite magnetisation in two domains in the ferromagnetic bar separated by a Bloch wall P'.

According to the invention, a transmitting transducer transmits an acoustic wave at end A' of ferromagnetic bar F', the wave being picked up by a receiver disposed along the bar. The transmitter or transducer are either solenoids S' extending around bar F' or devices each comprising a winding $E'_1$ coiled around a ferrite circuit $E'_2$ producing magnetic lines of force closing across the ferromagnetic bar.

The wave produced by the transmitter propagates along the bar and, when it travels through wall p', produces an inverse magnetostrictive effect resulting in a signal appearing at the receiver or at the terminals of a solenoid, if used. The bar has a absorber B' at its end opposite from A'.

According to the invention, in the variant using a receiving solenoid surrounding the bar, the wire winding has a different pitch at each end of the solenoid. The variable winding, like the trapezoidal electrode $S_4$ in the piezoelectric line, is designed to prevent interfering signals occurring when the wave travels past the ends of the solenoid. The device according to the last-mentioned variant embodiment is also characterised in that it comprises a generator supplying an a.c. modulated by the delayed signal to the input transducer of the ferromagnetic bar.

The invention will be more clearly understood from the following description of a non-limitative embodiment. The description refers to the accompanying drawings, in which.

Figure 3:
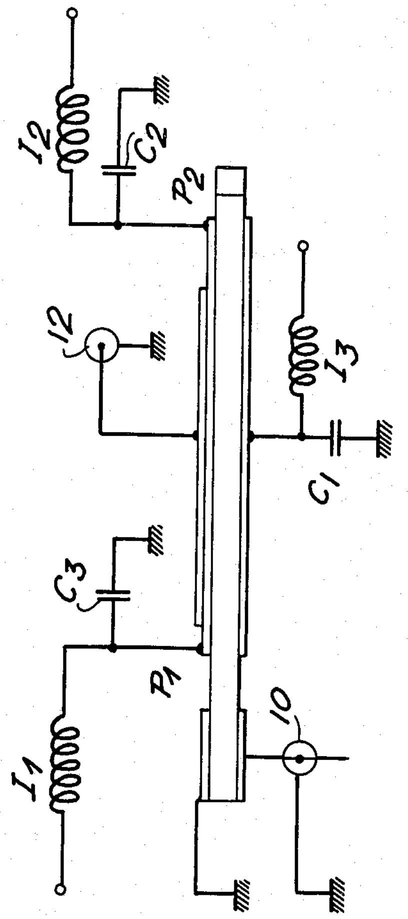
Figure 4:
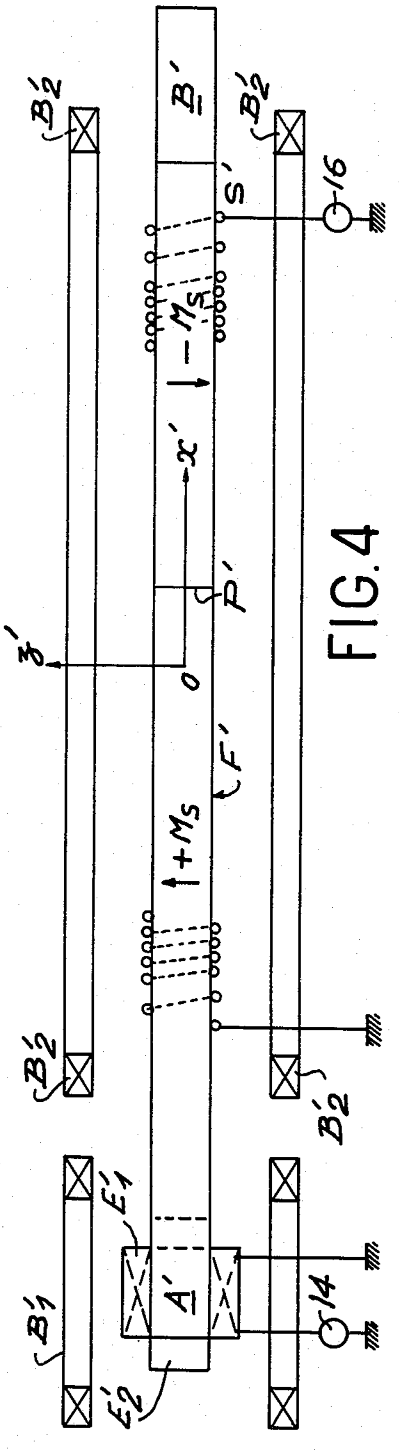
Figure 5:
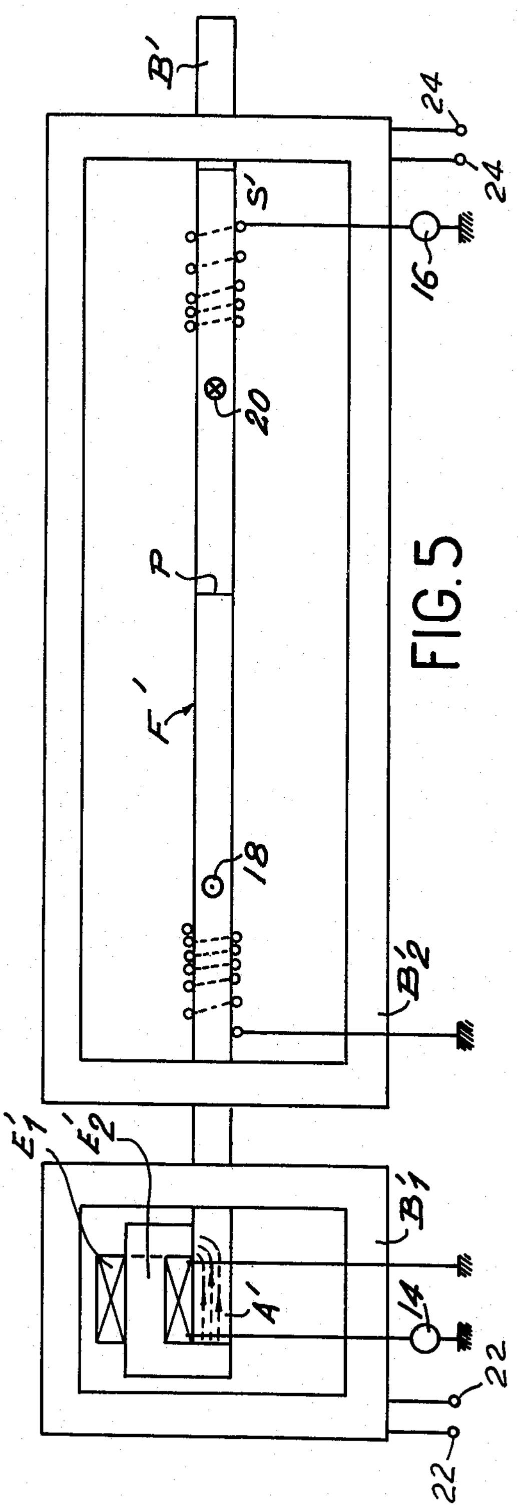

FIG. 3 diagrammatically shows the energisation and electric control of the piezoelectric delay line; and FIGS. 4 and 5 are diagrams of a magnetostrictive delay line.

As already stated, the invention provides a wall where there is a discontinuity in the piezoelectric constant of a ferroelectric material or in the magnetostrictive constant in a ferromagnetic material.

The position of the wall is dependent, in the case of the piezoelectric constant, on the position of an equipotential line between two electrodes and, in the case of the magnetostrictive constant, on the position of a surface $H = O$ inside the bar. Accordingly, the discontinuities in the piezoelectric and magnetostrictive constants are dependent on the existence of two domains, one on each side of the wall. The distance L between the wall P and the energising electrodes can be varied as required within limits imposed by the dimensions of the apparatus.

Figure 1:
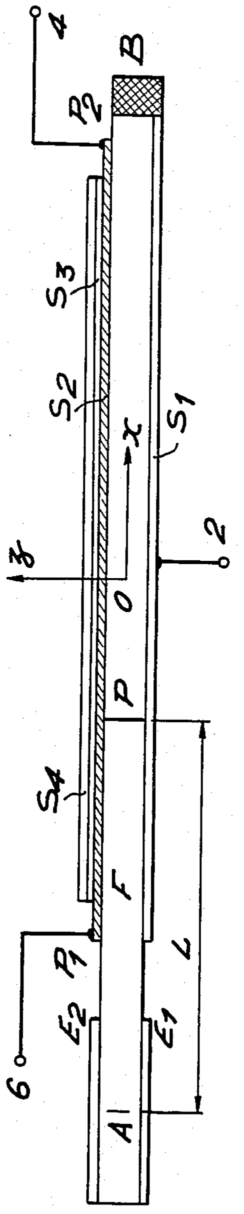
FIG. 1 is a diagram in elevation of the device comprising piezoelectric delay lines.

FIG. 1 shows a ferroelectric bar F whose polar axis extends in the direction Oz and on which various layers have been deposited, the nature and function of which will be described hereinafter. One end A of bar F forms the input for an electric signal transmitted by electrodes $E_1$ and $E_2$. The bar ends in an acoustic absorber B in order to avoid wave reflections. The assembly comprising electrodes $E_1$ and $E_2$ is a conventional piezoelectric transducer whose length along the Ox axis is equal to half the acoustic wavelength of the "carrier wave" in the material. This condition regarding the length of the electrodes must be respected if we are to obtain optimum coupling between the electric signal arriving at electrodes $E_1$ and $E_2$ and the acoustic wave emitted in the bar.

The output and delay regulating circuit comprises a metal electrode $S_1$ below the ferroelectric bar F, a resistive film $S_2$, a dielectric deposit $S_3$ and a second metal electrode $S_4$. The circuit for checking the position of wall P comprises an electrode $S_1$ brought to a d.c. control voltage $V_c$ and a resistive film $F_2$ terminating in contacts $P_1$ and $P_2$ brought respectively to the polarisation voltage $+V_p$ and $-V_p$, so that $-V_p < V_c < V_p$. As can be seen from this assembly the potential difference V between the two surfaces of the ferroelectric plate perpendicular to the polar axis varies from $V_p - V_c$ to $-V_p - V_c$ when moving along the plates from $P_1$ and $P_2$; since $V_c < V_p$ the electric field E between $S_1$ and $S_3$ is reversed at a point P which depends on $V_c$. According to the invention, the position of P can be varied from $P_1$ to $P_2$ by varying the checking potential $V_c$ from $-V_p$ to $+V_p$. Potential $V_c$ is applied at 2, potential $-V_p$ is applied at 4, and potential $+V_p$ is applied at 6. The polar axis of the ferroelectric plate extends along Oz. The output circuit comprises the aforementioned electrode $S_1$ and electrode $S_4$. $S_3$ is used to insulate the resistive film from the metal electrode $S_4$; its dimensions and its dielectric constant are such that a capacitance is introduced between electrodes $S_1$ and $S_4$ which is sufficiently large compared with the capacitance of the ferroelectric material between $S_1$ and $S_2$, so that the signal transmitted by wall P is preferentially picked up by electrodes $S_1$ and $S_4$.

Figure 2:
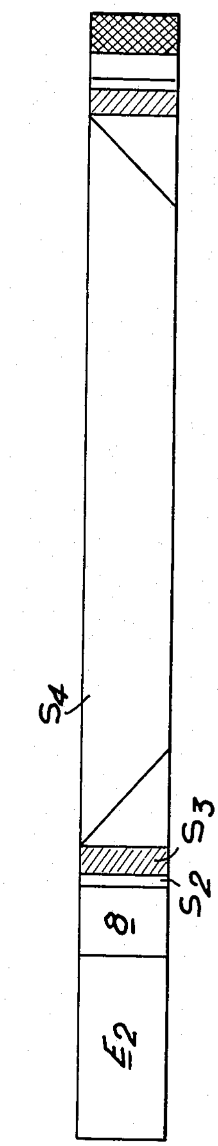
FIG. 2 is a diagram in plan view of the piezoelectric delay line.

FIG. 2 shows a delay line comprising bar F at 8, electrode $E_2$ seen from above electrode $S_2$, dielectric plate $S_3$ and electrode $S_4$, which has a trapeziodal shape to prevent an interfering response when the acoustic signal is transmitted at $P_1$ and $P_2$.

FIG. 3 is the circuit diagram of the system. Advantageously according to the invention, in order to avoid interfering signals, the delayed signal is separated from the delay-regulating signal by a cut-off inductance coil and a decoupling capacitor. The d.c. potentials are applied to the different electrodes via inductance coils $I_1$, $I_2$ and $I_3$ so as to prevent the a.c. signals from transmitter 10 directly energising the d.c. control electrodes. Similarly, points $P_1$ $P_2$ and electrode $S_1$ are connected to earth. In the input circuit, care is taken to earth the electrodes near $S_4$, e.g. $E_2$, to reduce the direct electrostatic coupling between the input and output.

The delay line operates as follows: Voltage $V_c$ is fixed and the wall is at a point P between $P_1$ and $P_2$ at a distance L from the transducer comprising electrodes $E_1$ and $E_2$; the input voltage in the form of a carrier wave having a frequency $f$ modulated by the delayed signal is applied between $E_1$ and $E_2$. This voltage induces a purely longitudinal acoustic wave propagates in the direction Ox in the ferroelectric material. When the wave travels through wall P, owing to the discontinuity in the piezoelectric coefficient the wave induces a modulated a.c. field along 0z which in turn produces a modulated a.c. potential difference between electrodes $S_1$ and $S_4$. Interfering responses during the transit of the acoustic wave $P_1$ and $P_2$ are reduced, since electrode $S_4$ has a suitable trapezoidal shape. The receiver connected between earth and electrode $S_4$ is disposed at 12, and the decoupling capacitors are denoted $C_1$, $C_2$ and $C_3$.

FIGS. 4 and 5 are diagrams of a magnetostrictive delay line. A bar F′ made of ferromagnetic material comprises an absorber at B′ for a wave travelling along the bar, waves being transmitted by a transducer comprising the assembly $E'_1$ and $E'_2$. Windings $B'_1$ and $B'_2$ produce magnetic fields along the 0′$z'$ axis in diametrically opposite directions. The position of wall P′ can be varied by acting on the currents flowing in windings $B'_1$ and $B'_2$. The wall P′ separates a domain having a magnetisation $+M_s$ parallel to 0$z$ from a domain having magnetisation $-M_s$ anti-parallel to 0$z$. A generator 14 supplies current flowing in solenoid $E'_1$ surrounding a ferrite $E'_2$; a magnetic field is thus provided along 0′$x'$ and produces a wave travelling along the ferromagnetic bar F′. The transmitting transducer is disposed at end A′ of bar F′. A solenoid S′ is coiled around bar F′ in order to pick up the signal which is transmitted by the wave when it reaches the wall P′, since the wave induces currents in the solenoid which are picked up by a recorder at 16. References 18 and 20 show the direction of magnetisation in bar F′. References 22 and 24 denote terminals connected to adjustable d.c. generators. The pitch of solenoid S′ is tapered at its two ends to prevent the signal inducing interfering voltages at 16 when it reaches the ends of the solenoid.

Of course, the invention is not limited to the embodiment described but includes geometrical shapes which are equivalent, with regard to the operation of the device, to those described in the various drawings; inter alia the shape of the electrodes and the geometrical configuration of the ferroelectric and ferromagnetic materials. The aforementioned piezoelectric or magnetostrictive electronically-controlled variable delay lines may bave advantages over prior art devices. They are as efficient as an acoustic-optic delay line but are much simpler and can be integrated.

I claim:

1. A device for varying the delay of a delay line comprising an elongated bar (F) of ferroelectric material of substantially uniform cross-section and having a wall (P) where the piezoelectric constant is discontinuously disposed in the path of a wave propagated longitudinally in said bar and further comprising means for producing and regulating the position of a wall (P) where the piezoelectric constant is discontinuous, the wall coinciding with the position of a flat equipotential surface oriented transversely of the bar, the device being characterised in that said elongated bar made of a ferroelectric material is provided with first and second polarizing electrodes on opposite sides of the bar with respect to a polarity direction transverse of said bar, said electrodes respectively being a first electrode ($S_1$) made of a conductive material and a second electrode ($S_2$) made of resistive material, and in that a d.c. voltage ($V_c$) is applied to said first electrode ($S_1$) and d.c. voltages $+V_p$ and $-V_p$ are applied to the two longitudinally spaced ends ($P_1$ and $P_2$) of said second electrode ($S_2$) so that $-V_p < V_c < V_p$.

2. A device according to claim 1, equipped for operation with carrier waves of a predetermined carrier frequency, characterised in that it comprises two transmitting electrodes ($E_1$ and $E_2$) having a length disposed longitudinally of said bar equal to half the wave length of the longitudinal acoustic wave of said carrier frequency in the ferroelectric material, said transmitting electrodes ($E_1$ and $E_2$) being arranged so as to generate a signal-modulated acoustic wave in said bar and being disposed on opposite sides of said bar (F), the device also comprising a third electrode ($S_4$) disposed on the opposite side of said bar from said first polarizing electrode ($S_1$) and constituting therewith means for detecting interaction of said modulated carrier wave and said wall (P) in said bar (S).

3. A device according to claim 2, characterised in that said third electrode ($S_4$) is separated from said second polarizing electrode $S_2$ by a dielectric plate, so that the capacitance formed by said third electrode and said second polarizing electrode is much greater than that formed by said first and second polarizing electrodes.

4. A device according to claim 3, characterised in that said third electrode ($S_4$) is in the form of a thin plate of trapezoidal contour having the trapezoid bases aligned in the longitudinal direction of the bar.

5. A device according to claim 4, characterised in that it comprises an a.c. generator modulated by a signal to be delayed and energizing a first one ($E_1$) of said transmitting electrodes, the other ($E_2$) of said transmitting electrodes being earthed and said third electrode ($S_4$) being connected to a receiver, and in that the device also comprises d.c. voltage generators supplying said polarizing electrodes ($S_1$ and $S_2$) via inductance coils in series, and comprises decoupling capacitors connected to earth at points between the last mentioned electrodes and the respective inductance coils.

6. A device for providing a delay line of variable delay comprising an elongated bar (F) of ferromagnetic material of substantially uniform cross-section having an axis of easy magnetization (0z′) perpendicular to the direction of elongation of said bar and further comprising first and second magnetizing coils ($B'_1$ and $B'_2$) arranged to be energized by adjustable currents producing opposite magnetic fields in opposite directions of said axis of easy magnetization respectively in two portions of said bar on opposite sides of a magnetic domain wall transversely intersecting said bar, whereby the adjustment of the respective magnitudes of said currentsf determines the location of said magnetic domain wall along the longitudinal direction of said bar, and further comprising means at one end of said bar for magnetostrictively exciting modulated acoustic waves in said bar and means for detecting the passage of said acoustic waves through said domain wall.

7. A device according to claim 6, in which said means for detecting the passage of said modulated acoustic waves through said magnetic domain wall includes a winding coaxial with said bar extending over the length of that portion of said bar which contains all the locations of said magnetic domain wall that may be produced by adjustment of the respective currents of said coils and having a tapered winding pitch at each end of said winding for reducing the false signals generated by interaction of said modulated acoustic waves and the ends of said winding.

8. A method according to claim 7, in which said modulated acoustic wave is excited by means including a pair of transmitting electrodes on opposite sides of said bar with reference to the said direction of polarization and in which there is also performed the step of substantially non-reflectively absorbing said modulated acoustic waves which reach the end of said bar opposite the end thereof at which said acoustic waves are excited.

9. A method of providing a variable delay of an electric signal comprising the steps of:

maintaining two adjacent regions of oppositely directed electric fields in an elongated bar of ferroelectric material having substantially uniform cross-section, the boundary between said regions being transverse to the longitudinal directions of said bar, said oppositely directed electric fields being maintained by the application of d.c. voltages to electrodes respectively extending along a substantial length of said bar on opposite sides of said bar with respect to a direction of electric field polarization, said application of potentials including applications of different potentials to the ends of a first of said electrodes constituted of resistive material and the application of an adjustable potential intermediate between said different potentials to the second of said electrodes, said second electrodes being made of conductive materials, thereby defining the location of an equid potential surface transverse to said bar constituting a wall between oppositely polarized regions of said bar;

exciting at one end of said bar modulated acoustic waves that propagate along the length of said bar, said acoustic waves being modulated by a signal to be delayed and being excited piezoelectrically, and detecting the passage of said modulated acoustic waves through said wall between said oppositely polarized regions in said bar, by detecting potentials piezoelectrically excited in an additional electrode extending substantially over said length of said bar opposite the aforesaid conductive electrode.

10. A method as defined in claim 8, in which the further step of varying the voltage applied to said first mentioned elongated conductive electrode is performed in order to vary the delay between the signal exciting said acoustic waves and the signal detected by the passage of said waves through said wall.

11. A method of providing a variable delay of an electric signal which comprises the steps of:

maintaining regions of oppositely directed magnetic fields in an elongated ferromagnetic bar of substantially uniform cross-section, said oppositely directed magnetic fields being directed parallel to an axis of easy magnetization which is perpendicular to the direction of elongation of said bar, said regions being thereby separated by a domain wall transverse to said bar, the step of maintaining said regions of oppositely directed magnetization being performed by maintaining magnetizing currents respectively in a plurality of coils arranged to magnetize respectively in one direction and the opposite direction parallel to said transverse axis of magnetization of said bar;

magnetostrictively exciting one end of said bar to propagate a longitudinal modulated acoustic carrier wave towards the other end of the bar, the modulation of the carrier frequency of said wave being in accordance with the signal to be delayed, and detecting the passage of said modulated acoustic wave through said domain wall in said bar.

12. A method according to claim 11, including the further step of varying the delay signal by varying the current in at least one of said coils magnetizing said bar in a direction along said transverse axis of easy magnetization.

13. A method according to claim 11, including the further step of absorbing the modulated acoustic waves reaching the end of said bar remote from the end at which said acoustic waves are excited.

* * * * *